Figure 1:
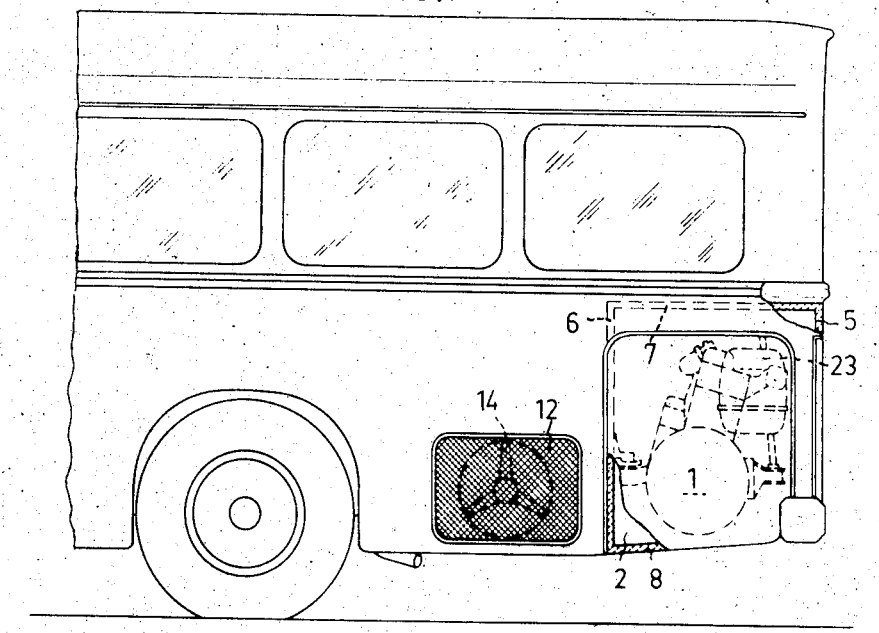

United States Patent [19]
Gustavsson

[11] 3,774,710
[45] Nov. 27, 1973

[54] SOUND-PROOFING INSTALLATION SYSTEM FOR VEHICLE POWER UNITS

[75] Inventor: Bengt Henrik Gustavsson, Katrineholm, Sweden

[73] Assignee: Saab-Scania Aktiebolag, Linkoping, Sweden

[22] Filed: June 11, 1971

[21] Appl. No.: 152,237

[30] Foreign Application Priority Data
July 17, 1970   Sweden.............................. 9935/70

[52] U.S. Cl............ 180/54 A, 123/41.51, 180/68 R, 181/33 K
[51] Int. Cl............................................. B60k 13/00
[58] Field of Search............. 180/54 A, 68 R, 69 R; 181/33 K, 36 D; 123/41.51; 105/62 A

[56] References Cited
UNITED STATES PATENTS

| | | | |
|---|---|---|---|
| 2,205,636 | 6/1940 | Smith............................... | 180/54 A |
| 1,754,257 | 4/1930 | Britt................................. | 105/62 A |
| 2,288,696 | 7/1942 | Funderburk..................... | 123/41.29 |
| 1,997,299 | 4/1935 | Herr................................. | 105/62 A |
| 2,204,926 | 6/1940 | Clingerman..................... | 180/54 A |
| 2,253,438 | 8/1941 | Lutz................................. | 180/68 R |
| 2,705,540 | 4/1955 | Zierer.............................. | 180/54 A |
| 3,147,814 | 9/1964 | Suhre.............................. | 180/54 A |

FOREIGN PATENTS OR APPLICATIONS

| | | | |
|---|---|---|---|
| 761,751 | 6/1967 | Canada........................... | 181/33 K |
| 891,207 | 11/1943 | France............................ | 180/54 A |
| 1,208,482 | 9/1959 | France............................ | 181/33 K |

Primary Examiner—Kenneth H. Betts
Assistant Examiner—John A. Pekar
Attorney—Cushman, Darby & Cushman

[57] ABSTRACT

A soundproofing installation system for vehicle power units, particularly in buses with rearmounted power units, where the engine is located in a closed chamber, the chamber being in the form of a double-wall box and comprising an integral part of the vehicle structure. At least some of the confining walls of the chamber are provided with soundproofing material, and the chamber accomodates power transmission means connected to the engine, and is provided with sealed lead-throughs for systems located externally of the chamber and connected to or forming part of the power unit. The radiator system is divided into two systems, each with a separately driven fan, and is located outside the chamber.

5 Claims, 3 Drawing Figures

SOUND-PROOFING INSTALLATION SYSTEM FOR VEHICLE POWER UNITS

The present invention relates to a sound-proofing installation system for vehicle power units, and is concerned more particularly to such a system in vehicles, e.g. buses, of the type in which the vehicle power unit is mounted at the rear of the vehicle and the engine of the vehicle is housed in a closed chamber.

One problem presented by buses of the type in which the power unit is mounted in a conventional way at the rear of the vehicle is the disturbing noise created, for example, by the engine, the power transmission means, the cooling fans, and the resonance sound caused in the body of the vehicle by the vibration of these and other vehicle components. In addition to causing discomfort outside the vehicle, this noise is also particularly disturbing inside the vehicle itself, especially in the vicinity of the back seats.

It is previously known, for reasons of space, to arrange the fans and radiator of the vehicle outside a closed engine chamber; see for example Swedish Pat. No. 147,677. The reason for this type of installation was promoted solely by the difficulty of finding sufficient space with more conventional installation systems to house larger power units.

The object of the present invention is to provide a power unit installation system which substantially reduces or eliminates the aforementioned disturbing noise, thereby rendering the vehicle quieter and more comfortable than vehicles having conventional power unit installations. Another object of the invention is to protect the engine from impact damage, e.g. as a result of a collision from the rear.

This is achieved in accordance with the invention by the fact that the engine chamber has the form of a double wall box structure, preferably made of sheet metal, which forms an integral part of the vehicle structure and is provided with sound-proofing material in at least the roof and side walls of the box structure, and which box structure accomodates power transmission means connected to the engine and is provided with lead-throughs which are sealed in a known manner and which accomodate systems located externally of the chamber and connected to or belonging to the power unit. Thus, in this way, sound eminating from the engine and the transmission is insulated in the closed chamber, while the sound-proofing material in the defining walls of the chamber renders the occurrence of resonance oscillations in the defining walls difficult and dampens unavoidable noise.

As with known installation systems, a part of the engine cooling system, mainly the radiator and fan means, is located according to the system of the present invention externally of the engine chamber. In this respect it is convenient to divide the radiator system into at least two separate radiators placed opposite each other on generally their respective sides of the vehicle and each provided with a separately driven cooking fan. By dividing the radiator system in this way, the size of each fan can be made smaller than the size of one single large fan to produce the required effect, thereby reducing the noise level from each fan as a result of the subsequent reduction of the socalled peak effect. Tests have shown that with two small fans, which together provide the same cooling effect as one single fan, there is obtained considerably less fan noise.

In accordance with another favourable concept of the invention, each of the fans is capable of being connected to or disconnected from the engine cooling system by means of thermostats which are connected to the engine block or the cooling water system and which can be disconnected to enable the cooling fans to be regulated manually. This arrangement allows the fans to be driven either singly or together or to be temporarily disconnected according to prevailing cooling requirements. Thus, in this way the engine power is utilized to more advantage and it is possible for the driver of the vehicle, in certain situations, to increase or decrease the cooling effect depending upon the conditions in which the vehicle is driven.

According to another concept of the invention, the chamber is provided with an air intake through which the engine — acting as a suction pump — draws in its air for combustion via an air cleaner, the air of combustion being caused to flow around the engine before being drawn into the air cleaner. Thus, in this way the engine chamber is well ventilated at the same time as the inflowing air is used to cool the engine by being brought into contact therewith. The air drawn into the chamber is thus in this way preheated.

In accordance with yet another aspect of the invention, subsequent to passing the air intake, the air drawn therethrough is passed through an intake silencing means before entering the engine chamber, thereby reducing the sound level of the air entering the chamber. The intake silencing means also prevents sound within the chamber from penetrating to the surroundings.

Figure 2:
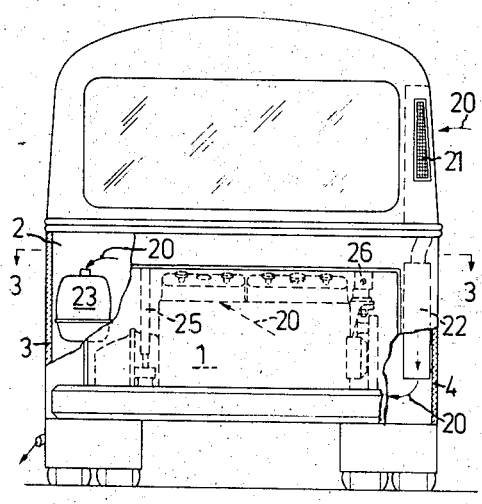
Figure 3:
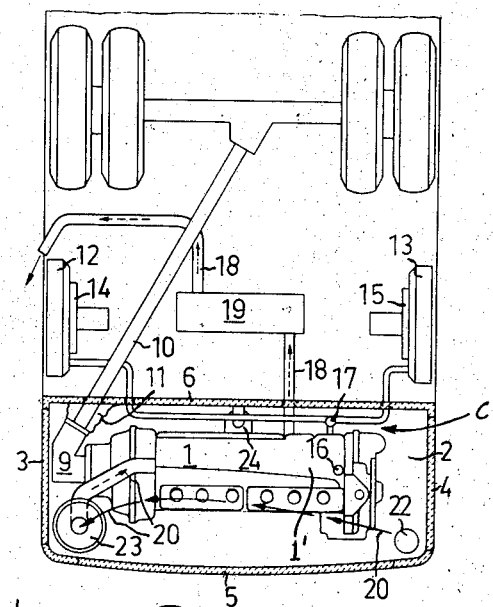

The invention will now be described with reference to an embodiment thereof illustrated in the accompanying drawings, in which FIG. 1 is a side view of a bus with a power unit placed at the rear thereof and installed in accordance with the invention, FIG. 2 is a rear view of the power unit installation system and FIG. 3 is a plan view, partly in section, of the same installation.

Referring to FIGS. 1–3, the power unit 1 is mounted at the rear of the vehicle with its long axis arranged transversely of the long axis of the vehicle. The power unit 1 is fully enclosed in a chamber 2 whose defining walls or sides form an integral part of the vehicle structure. The short sides 3 and 4 of the chamber 2 form a part of respective sides of the vehicle while the rear long side 5 of the chamber is a part of the rear side of the vehicle. The three chamber sides 3, 4 and 5 are provided with a number of access panels or the like to enable ready access to the chamber from without. The remaining defining surfaces of the chamber, i.e. the front long side 6, the roof 7 and the floor 8, may also be provided with access panels or may be made fully detachable.

The defining walls of the chamber 2 are suitably in the form of double-wall structures, partly in order to increase their rigidity and partly to provide accomodation for sound-proofing material in at least the roof and the side walls of the chamber. The walls may suitably be of sheet metal or other rigid material suitable for use in vehicle bodies and it is convenient to provide the inner wall facing the power unit 1 with perforations. The sound-proofing filling may suitably be in the form of at least two different layers, an outer layer and an inner layer, the outer layer being attached to the inside of the outer wall and being in the form of a sound damping composition, suitably asphalt or the like, or a sound damping carpet of specific weight, while the inner layer, which is located nearest the perforations, comprises a sound absorbing material such as mineral wool or the like. The outer layer is mainly intended to dampen vibrations and resonance oscillations, and the most effective thicknesses of the two layers should be arrived at experimentally.

The chamber 2 also accomodates the power transmission means 9 of the power unit and the output drive shaft 10 extends through the front long side 6 of the chamber in a sealed lead-through 11 which is suitably in the form of a rubber bellows structure for example. Placed externally of and in front of the chamber 2 are the vehicle radiator and fan means which in the illustrated embodiment comprises two radiators 12 and 13, each of which is provided with a cooling fan 14 and 15, respectively. The cooling fans are suitably driven electrically and independently of each other. Each of the radiators 12,13 is placed on its respective side of the vehicle, adjacent to or at respective sides thereof, in a manner whereby the plane of rotation of the cooling fans is generally parallel with the longitudinal direction of the vehicle. The fans 14,15 are mounted in vibration damping suspensions, suitably by means of rubber elements or other appropriate elements, and the size of each fan is smaller than that required for only one single fan to produce the desired cooling effect. The two fans are both controlled by thermostats 16,17 connected with either the engine block 1 of the power unit or the cooling water system c and, when necessary, can be individually connected to or disconnected from their respective thermostats, according to cooling requirements. It is also possible in accordance with the invention to disconnect the thermostats and control the cooling fans 14,15 manually in a desired manner.

The exhaust pipe 18 of the engine passes through the front long side 6 of the chamber and the larger portion of exhaust pipe 18 and the silencer 19 are located externally of the chamber 2. Similarly to what is normal in engines fitted to watergoing craft, the exhaust pipe is provided with a water jacket, and its cooling water system is connected in parallel with the cooling water system of the engine block.

Air for combustion 20 is drawn into the chamber via an air intake 21 located high up on the rear, right-hand corner of the vehicle, and a suction silencer 22, which also serves to prevent sound from the chamber 2 from reaching the surroundings and which opens out low down in the chamber at the same short side as the air intake 21. The engine 1 acts as a suction pump and draws in the air sucked into the chamber via an air cleaner located high up and adjacent the other short side of the chamber, whereupon the air flows around the engine to cool the same. As a result of this, the air for combustion is preheated and any gases leaking from the engine, e.g. from the engine crank case, are sucked away to provide for good ventilation of the chamber.

In accordance with the invention, all lead-throughs carrying control wires or rods, electrical conductors and the like through the defining surfaces of the chamber are sealed in a suitable manner so as to maintain the chamber in a sealed condition and so that a minimum of noise or vibrations is or are propagated to the surroundings or to the surrounding system.

The engine mounting system is in the form of a three-point mounting, an attachment 24 mounted on the front long side of the engine being secured to the front wall of the chamber, while each of the two remaining attachments 25,26 is placed generally at its respective outer end of the rear long side of the engine and secured to the roof of the chamber.

Although the invention has been described and illustrated with reference to a specific embodiment thereof, it will be understood that the invention is not restricted thereto but can be modified within the scope of the accompanying claims.

What is claimed is:

1. Arrangement for installation of an engine power unit in a bus having a self-supporting body comprising:
   a rearmounted engine laterally positioned in the bus having a power transmission means, a cooling system, a gear box, an angular transmission and output drive shaft;
   a chamber including a bottom, a roof and transversely and longitudinally extending walls, the extending walls defining confining surfaces, the confining surfaces, the roof and bottom have double walls comprising an inner and an outer panel;
   a vibration and sound-absorbing material positioned in the interspace between the inner and the outer panels of the roof and the confining surfaces;
   the rear transverse wall and the longitudinal walls constitute part of the rear and rear side walls, respectively, of the bus, each forming with their respective outer panels a part of the bus exterior;
   the roof, front transverse wall and the bottom united with the longitudinal sides to rigidly form a said chamber, having the engine, gear box, angular and power transmissions and cooling system located inside said chamber; and
   at least one sound-proofed lead-through extending through the confining surfaces to said chamber.

2. The arrangement according to claim 1 further comprising: two separate radiators connected exteriorly of said chamber, each having a separately driven cooling fan.

3. An arrangement according to claim 2 wherein the cooling fan is capable of being disconnected by means of thermostats connected to the engine block or to the engine water cooling system, said thermostats also being capable of being disconnected to enable the cooling fans to be regulated manually.

4. An arrangement according to claim 1, wherein an air intake is provided in said chamber for permitting air to travel through said chamber to the engine, a suction silencer arranged in said chamber for communicating with the air intake, an air cleaner operably connected to the engine and arranged relative thereto for accepting air from the air intake only after the air has flowed about the engine subsequent to being sucked into said chamber by the engine and communicating with the suction silencer.

5. Arrangement according to claim 1, wherein a major portion of the engine cooling system includes a radiator and a cooling fan means that is located externally of said chamber, characterized in that the radiator is divided into at least two separate radiators which are located opposite each other, generally on respective sides of the vehicle, each radiator is provided with a separately driven cooling fan, each cooling fan is controlled by means of thermostats connected to the engine cooling water system, and that said thermostats are capable of being disconnected to enable the cooling fans to be regulated manually.

* * * * *